United States Patent [19] [11] 4,165,977
Fischer, deceased [45] Aug. 28, 1979

[54] HERBICIDAL COMPOSITIONS

[75] Inventor: Adolf Fischer, deceased, late of Mutterstadt, Fed. Rep. of Germany, by Caecilia E. Fischer, heiress-at-law

[73] Assignee: BASF Aktiengesellschaft, Ludwigshafen, Fed. Rep. of Germany

[21] Appl. No.: 783,209

[22] Filed: Mar. 31, 1977

Related U.S. Application Data

[62] Division of Ser. No. 624,941, Oct. 22, 1975, Pat. No. 4,030,909.

[30] Foreign Application Priority Data

Nov. 14, 1974 [DE] Fed. Rep. of Germany ....... 2453908

[51] Int. Cl.$^2$ ................................................ A01N 9/12
[52] U.S. Cl. ........................................... 71/91; 71/113
[58] Field of Search ............................ 71/91, 113, 106

[56] References Cited

U.S. PATENT DOCUMENTS

| | | | |
|---|---|---|---|
| 3,048,483 | 8/1962 | Weil et al. | 71/113 |
| 3,288,586 | 11/1966 | Littler | 71/113 |
| 3,413,300 | 11/1968 | Haertl | 71/113 |
| 3,708,277 | 1/1973 | Zeidler et al. | 71/91 |
| 3,940,260 | 2/1976 | Kauffman | 71/113 |
| 3,940,389 | 2/1976 | McKendry et al. | 71/91 |

OTHER PUBLICATIONS

Fischer, "Synergistic Herbicide Compositions, etc.," (1973), CA8O No. 44705q, (1974).

*Primary Examiner*—Glennon H. Hollrah
*Attorney, Agent, or Firm*—Keil & Witherspoon

[57] ABSTRACT

New and valuable herbicides containing compositions of benzothiadiazinone dioxides with other active ingredients.

4 Claims, No Drawings

HERBICIDAL COMPOSITIONS

This application is a division of application Ser. No. 624,941, filed Oct. 22, 1975, now U.S. Pat. No. 4,030,909.

The present invention relates to herbicides containing compositions with benzothiadiazinone dioxides.

It is known that sulfonylglycolic acid amides (German Laid-Open Applications DOS No. 2,201,432; DOS No. 2,334,715; and DOS No. 2,219,923), azetidine carbothiolates (German Laid-Open Application DOS No. 2,312,045), hexahydroazepine carbothiolates (German Laid-Open Application DOS No. 1,300,947), benzofuranyl sulfonates (German Laid-Open Application DOS No. 1,926,139), butynyl carbamates (German Laid-Open Application DOS No. 2,364,876), carboxylic acid derivatives (German No. 959,066), phosphonomethyl glycines (German Laid-Open Application DOS No. 2,152,826), phthalamides (British No. 671,153), anilides (British No. 903,766), pyrazolium compounds (German Laid-Open Application DOS No. 2,260,485) and nitrophenol derivatives (British No. 425,295) have a herbicidal action. However, the action of these compounds when used individually is not always satisfactory.

I have now found that compositions consiting of one or more of these active ingredients and benzothiadiazinone derivatives, which are known to be effective herbicidal active ingredients (German Laid-Open Application DOS No. 1,542,836), have, surprisingly, a herbicidal action superior to that of their individual components.

The compositions consist of a. a benzothiadiazinone dioxide of the formula

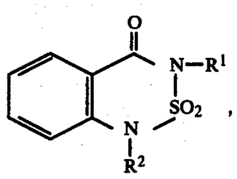

where $R^1$ denotes lower alkyl and $R^2$ denotes alkoxyalkyl, hydrogen or a cation, and b. a carboxylic acid derivative of the formula

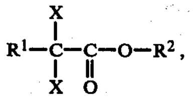

where $R^1$ denotes halogen, alkyl, haloalkyl, benzyl, phenylchloromethyl or benzamidooxy, X denotes hydrogen or halogen and $R^2$ denotes unsubstituted or halogen-substituted alkyl or benzyl, hydrogen or cations, or an ester or amido group.

The active ingredients listed in the following tables are examples of components:

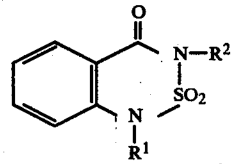

| $R^1$ | $R^2$ |
|---|---|
| H | $CH_3$ |
| Na | $CH_3$ |
| $(CH_3CH_2)_3NH$ | $CH_3$ |
| 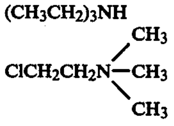 | $CH_3$ |
| 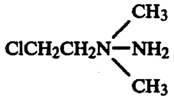 | $CH_3$ |
| $(CH_3)_2NH_2$ | $CH_3$ |
| $(HOCH_2CH_2)_2NH_2$ | $CH_3$ |
| $HOCH_2CH_2NH_3$ | $CH_3$ |
| $n\text{-}C_4H_9NH_3$ | $CH_3$ |
| H | $C_2H_5$ |
| Na | $C_2H_5$ |
| $(CH_3)_3NH$ | $C_2H_5$ |
| 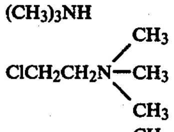 | $C_2H_5$ |
| 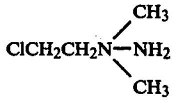 | $C_2H_5$ |
| $(CH_3)_2NH_2$ | $C_2H_5$ |
| $(CH_3CH_2)_2NH_2$ | $C_2H_5$ |
| 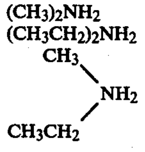 | $C_2H_5$ |

-continued

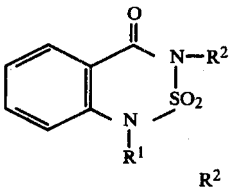

| $R^1$ | $R^2$ |
|---|---|
| $HOCH_2CH_2NH_3$ | $C_2H_5$ |
| $n\text{-}C_4H_9NH_3$ | $C_2H_5$ |
| H | $n\text{-}C_3H_7$ |
| Na | $n\text{-}C_3H_7$ |
| $(CH_3)_3NH$ | $n\text{-}C_3H_7$ |
| 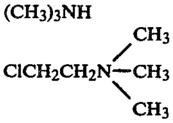 | $n\text{-}C_3H_7$ |
| 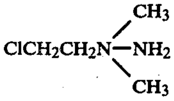 | $n\text{-}C_3H_7$ |
| $(CH_3)_2NH_2$ | $n\text{-}C_3H_7$ |
| $(HOCH_2CH_2)_2NH_2$ | $n\text{-}C_3H_7$ |
| $(CH_3CH_2)_2NH_2$ | $n\text{-}C_3H_7$ |
| $HOCH_2CH_2NH_3$ | $n\text{-}C_3H_7$ |
| $n\text{-}C_4H_9NH_3$ | $n\text{-}C_3H_7$ |
| H | $i\text{-}C_3H_7$ |
| Na | $i\text{-}C_3H_7$ |
| K | $i\text{-}C_3H_7$ |
| Li | $i\text{-}C_3H_7$ |
| $NH_4$ | $i\text{-}C_3H_7$ |
| ½ Ca | $i\text{-}C_3H_7$ |
| ½ Mg | $i\text{-}C_3H_7$ |
| 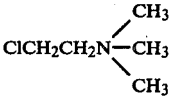 | $i\text{-}C_3H_7$ |
| 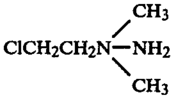 | $i\text{-}C_3H_7$ |
| $(CH_3)_2NH_2$ | $i\text{-}C_3H_7$ |
| $(HOCH_2CH_2)_2NH_2$ | $i\text{-}C_3H_7$ |
| $(CH_3CH_2CH_2)_2NH_2$ | $i\text{-}C_3H_7$ |
| $NH_2NH_3$ | $i\text{-}C_3H_7$ |
| $NH_2NH_3$ | $i\text{-}C_3H_7$ |
| $CH_3NH_3$ | $i\text{-}C_3H_7$ |
| $HOCH_2CH_2NH_3$ | $i\text{-}C_3H_7$ |
| $i\text{-}C_3H_7NH_3$ | $i\text{-}C_3H_7$ |
| $(CH_3)_2CH-O-(CH_2)_3-NH_3$ | $i\text{-}C_3H_7$ |
| $CH_3(CH_2)_3-CH-CH_2-O-(CH_2)_3-NH_3$<br>$C_2H_5$ | $i\text{-}C_3H_7$ |
| $CH_3(CH_2)_5NH_3$ | $i\text{-}C_3H_7$ |
| $CH_3(CH_2)_3CHCH_2NH_3$<br>$C_2H_5$ | $i\text{-}C_3H_7$ |
| $C_{10}H_{21}NH_3$ | $i\text{-}C_3H_7$ |
| $C_{12}H_{25}NH_3$ | $i\text{-}C_3H_7$ |
| $C_{13}H_{27}NH_3$ | $i\text{-}C_3H_7$ |
| $C_{12}H_{25}NHCNH_3$<br>NH | $i\text{-}C_3H_7$ |
| $C_{14}H_{29}NH_3$ | $i\text{-}C_3H_7$ |
| $C_{16}H_{33}NH_3$ | $i\text{-}C_3H_7$ |
| $C_{18}H_{35}NH_3$ | $i\text{-}C_3H_7$ |
| $C_{18}H_{37}NH_3$ | $i\text{-}C_3H_7$ |
| 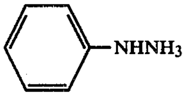 | $i\text{-}C_3H_7$ |
| 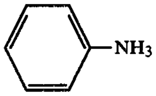 | " |

-continued

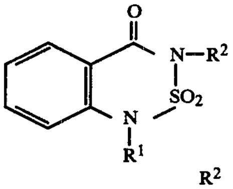

| $R^1$ | $R^2$ |
|---|---|
| 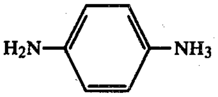 | " |
| 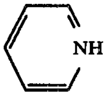 | " |
| 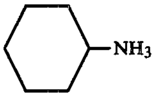 | " |
| 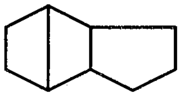 | " |
| 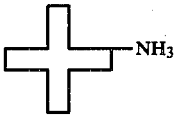 | " |
| 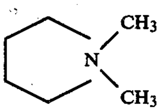 | " |
| 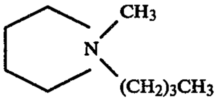 | " |
| 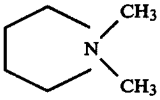 | " |
| 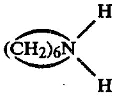 | " |
| 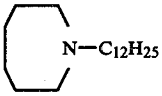 | " |
| 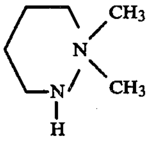 | " |
| 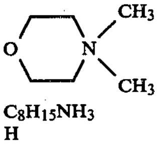 | " |
| $C_8H_{15}NH_3$ | " |
| H | $n\text{-}C_4H_9$ |
| Na | " |
| $(CH_3)_2NH_2$ | " |
| $(HOCH_2CH_2)_2NH_2$ | " |
| 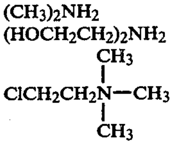 | " |

-continued

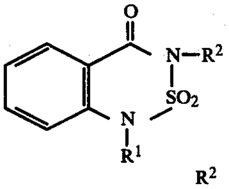

| $R^1$ | $R^2$ |
|---|---|
| $ClCH_2CH_2N(CH_3)_2-NH_2$ | n-$C_4H_9$ |
| H | sec.-$C_4H_9$ |
| Na | " |
| Li | " |
| $(CH_3)_2NH_2$ | " |
| $(HOCH_2CH_2)_2NH_2$ | " |
| $(CH_3)_2CHNH_3$ | " |
| $CH_3(CH_2)_9NH_3$ | " |
| $CH_3(CH_2)_{11}NH_3$ | " |
| $C_{13}H_{27}NH_3$ | " |
| $CH_3(CH_2)_{13}NH_3$ | " |
| $C_{16}H_{33}NH_3$ | " |
| $CH_3(CH_2)_{17}NH_3$ | " |
| $CH_3(CH_2)_7CH=CH(CH_2)_8$ | " |
| $C_{12}H_{25}NH-C(=NH)-NH_3$ | " |
| 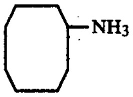 | " |
| 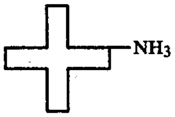 | " |
| 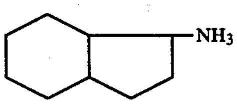 | " |
| H | $-CH(CH_2Cl)C_2H_5$ |
| H | i-$C_4H_9$ |
| Na | " |
| $(CH_3)_2NH_2$ | " |
| $(HOCH_2CH_2)_2NH_2$ | " |
| Na | $-CH_2CH(CH_3)C_2H_5$ |
| H | $-CH(CH_3)CH(CH_3)_2$ |
| H | $-CH(C_2H_5)_2$ |
| Na | " |
| $(CH_3)_2NH_2$ | " |
| $(CH_3)_2CHNH_3$ | $-CH(C_2H_5)_2$ |
| $(CH_3CH_2CH(CH_3))_2NH_2$ | " |
| Na | $-CH(CH_3)CH_2CH(CH_3)_2$ |
| Na | $-CH(C_2H_5)-(CH_2)_3CH_3$ |
| $-CH(CH_3)OCH_3$ | i-$C_3H_7$ |
| $-CH(CH_3)OC_2H_5$ | " |
| $-CH(CH_3)OCH_2CH(CH_3)_2$ | " |
| $-CH(CH_3)O(CH_2)_{17}CH_3$ | " |
| $-CH(OCH_3)CH(CH_3)_2$ | " |

$$R^1-\underset{Y}{\overset{X}{C}}-COOR^2$$

| $R^1$ | $R^2$ | X | Y |
|---|---|---|---|
| Cl | Na | Cl | Cl |
| $CH_3$ | Na | Cl | Cl |
| $CH_2Cl$ | Na | Cl | Cl |
| $CH_3$ | $CH_2-C_6H_5$ | Cl | Cl |
| $C_2H_5$ | Na | Cl | Cl |

-continued $$R^1-\underset{Y}{\overset{X}{C}}-COOR^2$$

| $R^1$ | $R^2$ | X | Y |
|---|---|---|---|
| $CHF_2$ | Na | F | F |
| $CH_3$ | $CH_2CH_2Cl$ | Cl | Cl |

-continued

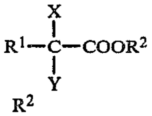

| $R^1$ | $R^2$ | X | Y |
|---|---|---|---|
| 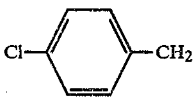 | $CH_3$ | H | Cl |
| $C_6H_5$—CO—NHO | H (salts, esters) | H | H |
| $C_6H_5CHCl$ | $NH_4$ | H | Cl |

The amount of any one component in the active ingredient compositions as such may vary from 5 to 95 wt%, preferably from 20 to 80 wt%, based on the composition.

The amount used of the agents according to the invention may vary and depends in essence on the type of effect to be achieved; it is generally from 0.1 to 15 (and more), preferably from 0.2 to 6, kg per hectare of active ingredient. The agents according to the invention may be used once or several times before or after planting, before sowing, and before, during or after emergence of the crop plants and unwanted plants.

Application may be effected for instance in the form of directly sprayable solutions, powders, suspensions, dispersions, emulsions, oil dispersions pastes, dusts, broadcasting agents, or granules by spraying, atomizing, dusting, broadcasting or watering. The forms of application depend entirely on the purpose for which the agent are being used; in any case they should ensure a fine distribution of the active ingredient.

For the preparation of solutions, emulsions, pastes and oil dispersions to be sprayed direct, mineral oil fractions of medium to high boiling point, such as kerosene or diesel oil, further coal-tar oils, etc. and oils of vegetable or animal origin, aliphatic, cyclic and aromatic hydrocarbons such as benzene, toluene, xylene, paraffin, tetrahydronaphthalene, alkylated naphthalenes and their derivatives such as methanol, ethanol, propanol, butanol, chloroform, carbon tetrachloride, cyclohexanol, cyclohexanone, chlorobenzene, isophorone, etc., and strongly polar solvents such as dimethylformamide, dimethyl sulfoxide, N-methylpyrrolidone, water, etc. are suitable.

Aqueous formulations may be prepared from emulsion concentrates, pastes, oil dispersions or wettable powders by adding water. To prepare emulsions, pastes and oil dispersions the ingredients as such or dissolved in an oil or solvent may be homogenized in water by means of wetting or dispersing agents, adherents or emulsifiers. Concentrates which are suitable for dilution with water may be prepared from active ingredient, wetting agent, adherent, emulsifying or dispersing agent and possibly solvent or oil.

Examples of surfactants are: alkali metal, alkaline earth metal and ammonium salts of ligninsulfonic acid, naphthalenesulfonic acids, phenolsulfonic acids, alkylaryl sulfonates, alkyl sulfates, and alkyl sulfonates, alkali metal and alkaline earth metal salts of dibutylnaphthalenesulfonic acid, lauryl ether sulfate, fatty alcohol sulfates, alkali metal and alkaline earth metal salts of fatty acids, salts of sulfated hexadecanols, heptadecanols, and octadecanols, salts of sulfated fatty alcohol glycol ether, condensation products of sulfonated naphthalene and naphtalene derivatives with formaldehyde, condensation products of naphthalene or naphthalenesulfonic acids with phenol and formaldehyde, polyoxyethylene octylphenol ethers, ethoxylated isooctylphenol, ethoxylated octylphenol and ethoxylated nonylphenol, alkylphenol polyglycol ethers, tributylphenyl polyglycol ethers, alkylaryl polyether alcohols, isotridecyl alcohol, fatty alcohol ethylene oxide condensates, ethoxylated castor oil, polyoxyethylene alkyl ethers, ethoxylated polyoxypropylene, lauryl alcohol polyglycol ether acetal, sorbitol esters, lignin, sulfite waste liquors and methylcellulose.

Powders, dusts and boradcasting agents may be prepared by mixing or grinding the active ingredients with a solid carrier.

Granules, e.g., coated, impregnated or homogeneous granules, may be prepared by bonding the active ingredients to solid carriers. Examples of solid carriers are mineral earths such as silica gel, silicic acid, silica gels, silicates, talc, kaolin, Attaclay, limestone, lime, chalk, bole, loess, clay, dolomite, diatomaceous earth, calcium sulfate, magnesium sulfate, magnesium oxide, ground plastics, fertilizers such as ammonium sulfate, ammonium phosphate, ammonium nitrate, and ureas, and vegetable products such as grain flours, bark meal, wood meal, and nutshell meal, cellulosic powders, etc.

The formulations contain from 1 to 99, and preferably 1 to 90% by weight of active ingredient composition.

There may be added to the compositions or individual active ingredients (if desired, immediately before use (tank-mix) ) oils of various types, herbicides, fungicides, nematocides, insecticides, bactericides, trace elements, fertilizers, antifoams (e.g., silicones), growth regulators, antidotes and other herbicidally effective compounds such as substituted anilines
substituted aryloxycarboxylic acids and salts, esters and
amides thereof,
substituted ethers
substituted arsonic acids and their salts, esters and amides
substituted benzimidazoles
substituted benzisothiazoles
substituted benzothiadiazinone dioxides
substituted benzoxazines
substituted benzoxazinones
substituted benzothiadiazoles
substituted biurets
substituted quinolines
substituted carbamates
substituted aliphatic carboxylic acids and their salts, esters
and amides
substituted aromatic carboxylic acids and their salts, esters
and amides
substituted carbamoylalkylthiol- or -dithiophosphates
substituted quinazolines
substituted cycloalkylamidocarbothiolic acids and their salts,
esters and amides
substituted cycloalkylcarbonamidothiazoles
substituted dicarboxylic acids and their salts, esters and
amides
substituted dihydrobenzofuranyl sulfonates
substituted disulfides
substituted dipyridylium salts substituted dithiocarbamates
substituted dithiophosphoric acids and their salts, esters and amides
substituted ureas
substituted hexahydro-1H-carbothioates
substituted hydantoins
substituted hydrazides
substituted hydrazonium salts
substituted isoxazole pyrimidones
substituted imidazoles
substituted isothiazole pyrimidones
substituted ketones
substituted naphthoquinones
substituted aliphatic nitriles
substituted aromatic nitriles
substituted oxadiazoles
substituted oxadiazinones
substituted oxadiazolidine diones
substituted oxadiazine diones
substituted phenols and their salts and esters
substituted phosphonic acids and their salts, esters and amides
substituted phosphonium chlorides
substituted phosphonalkyl glycines
substituted phosphites
substituted phosphoric acids and their salts, esters and amides
substituted piperidines
substituted pyrazoles
substituted pyrazole alkylcarboxylic acids and their salts, esters and amides
substituted pyrazolium salts
substituted pyrazolium alkyl sulfates
substituted pyridazines
substituted pyridazones
substituted pyridine carboxylic acids and their salts, esters and amides
substituted pyridines
substituted pyridine carboxylates
substituted pyridinones
substituted pyrimidines
substituted pyrimidones
substituted pyrrolidine carboxylic acid and its salts, esters and amides
substituted pyrrolidines
substituted pyrrolidones
substituted arylsulfonic acids and their salts, esters and amides
substituted styrenes
substituted tetrahydrooxadiazine diones
substituted tetrahydroxadiazole diones
substituted tetrahydromethanoindenes
substituted tetrahydroxadiazole thiones
substituted tetrahydrothiadiazine thiones
substituted tetrahydrothiadiazole diones
substituted aromatic thiocarbonylamides
substituted thiocarboxylic acids and their salts, esters and amides
substituted thiol carbamates
substituted thioureas
substituted thiophosphoric acids and their salts, esters and amides
substituted triazines
substituted triazoles
substituted uracils, and
substituted uretidine diones.

The last-mentioned herbicidal compounds may also be applied before or after the individual active ingredients or compositions thereof according to the invention.

These agents may be added to the herbicides according to the invention in a ratio by weight of from 1:10 to 10:1. The same applies to oils, fungicides, nematocides, insecticides, bactericides, antidotes and growth regulators.

The new compositions have strong herbicidal action and may therefore be used as weedkillers or for controlling the growth of unwanted plants. Whether the new active ingredients are used as total or selective agents depends in essence on the amount of ingredient used per unit area.

By weeds and unwanted plant growth are meant all monocotyledonous and dicotyledonous plants which grow in loci where they are not desired.

The agents according to the invention may therefore be used for controlling for instance Gramineae, such as

| | |
|---|---|
| Cynodon spp. | Dactylis spp. |
| Digitaria spp. | Avena spp. |
| Echinochloa spp. | Bromus spp. |
| Setaria spp. | Uniola spp. |
| Panicum spp. | Poa spp. |
| Alopecurus spp. | Leptochloa spp. |
| Lolium spp. | Brachiaria spp. |
| Sorghum spp. | Eleusine spp. |
| Agropyron spp. | Cenchrus spp. |
| Phalaris spp. | Eragrostis spp. |
| Apera spp. | *Phragmites communis* |
| etc.; | |
| Cyperaceae, such as | |
| Carex spp. | Eleocharis spp. |
| Cyperus spp. | Scirpus spp. |
| etc.; | |
| dicotyledonous weeds, such as | |
| Malvaceae, e.g., | |
| *Abutilon theoprasti* | Hibiscus spp. |
| Sida spp. | Malva spp. |
| etc.; | |
| Compositae, such as | |
| Ambrosia spp. | Centaurea spp. |
| Lactuca spp. | Tussilago spp. |
| Senecio spp. | *Lapsana communis* |
| Sonchus spp. | Tagetes spp. |
| Xanthium spp. | Erigeron spp. |
| Iva spp. | Anthemis spp. |
| Galinsoga spp. | Matricaria spp. |
| Taraxacum spp. | Artemisia spp. |
| Chrysanthemum spp. | Bidens spp. |
| Cirsium spp. | etc.; |
| Convolvulaceae, such as | |
| Convolvulus spp. | Cuscuta spp. |
| Ipomoea spp. | *Jaquemontia tamnifolia* |
| etc.; | |
| Cruciferae, such as | |
| *Barbarea vulgaris* | *Arabidopsis thaliana* |
| Brassica spp. | Descurainia spp. |
| Capsella spp. | Draba spp. |
| Sisymbrium spp. | *Coronopus didymus* |
| Thlaspi spp. | Lepidium spp. |
| *Sinapis arvensis* | Raphanus spp. |
| etc.; | |
| Geraniaceae, such as | |
| Erodium spp. | Geranium spp. |
| etc.; | |
| Portulacaceae, such as | |
| Portulaca spp. | etc.; |
| Primulaceae, such as | |
| *Anagallis arvensis* | Lysimachia spp. |
| etc.; | |
| Rubiaceae, such as | |
| Richardia spp. | Diodia spp. |
| Galium spp. | etc.; |
| Scrophulariaceae, such as | |
| Linaria spp. | Digitalis spp. |

-continued

| | |
|---|---|
| Veronica spp. | etc.; |
| Solanaceae, such as | |
| Physalis spp. | Nicandra spp. |
| Solanum spp. | Datura spp. |
| etc.; | |
| Urticaceae, such as | |
| Urtica spp. | |
| Violaceae, such as | |
| Viola spp. | etc.; |
| Zygophyllaceae, such as | |
| *Tribulus terrestris* | etc.; |
| Euphorbiaceae, such as | |
| *Mercurialis annua* | Euphorbia spp. |
| Umbelliferae, such as | |
| *Daucus carota* | *Ammi majus* |
| *Aethusa cynapium* | etc.; |
| Commelinaceae, such as | |
| Commelina spp. | etc.; |
| Labiatae, such as | |
| Lamium spp. | Galeopsis spp. |
| etc.; | |
| Leguminosae, such as | |
| Medicago spp. | *Sesbania exaltata* |
| Trifolium spp. | Cassia spp. |
| Vicia spp. | Lathyrus spp. |
| ect.; | |
| Plantaginaceae, such as | |
| Plantago spp. | etc.; |
| Polygonaceae, such as | |
| Polygonum spp. | Fagopyrum spp. |
| Rumex spp. | etc.; |
| Aizoaceae, such as | |
| *Mollugo verticillata* | etc.; |
| Amaranthaceae, such as | |
| Amaranthus spp. | etc.; |
| Boraginaceae, such as | |
| Amsinckia spp. | Anchusa spp. |
| Myostis spp. | Lithospermum spp. |
| etc.; | |
| Caryophyllaceae, such as | |
| Stellaria spp. | Silene spp. |
| Spergula spp. | Cerastium spp. |
| Saponaria spp. | *Agrostemma githago* |
| *Scleranthus annuus* | etc.; |
| Chenopodiaceae, such as | |
| Chenopodium spp. | Atriplex spp. |
| Kochia spp. | *Monolepis nuttalliana* |
| Salsola Kali | etc.; |
| Lythraceae, such as | |
| Cuphea spp. | etc.; |
| Oxalidaceae, such as | |
| Oxalis spp. | |
| Ranunculaceae, such as | |
| Ranunculus spp. | Adonis spp. |
| Delphinium spp. | etc.; |
| Papaveraceae, such as | |
| Papaver spp. | *Fumaria offinicalis* |
| etc.; | |
| Onagraceae, such as | |
| Jussiaea spp. | etc.; |
| Rosaceae, such as | |
| Alchemillia spp. | Potentilla spp. |
| etc.; | |
| Potamogetonaceae, such as | |
| Potamogeton spp. | etc.; |
| Najadaceae, such as | |
| Najas spp. | etc.; |
| Equisetaceae | |
| Equisetum spp. | etc.; |
| Marsileaceae, such as | |
| *Marsilea quadrifolia* | etc.; |
| Polypodiaceae, | |
| *Pteridium quilinum* | |
| Alismataceae, such as | |
| Alisma spp. | *Sagittaria sagittifolia* |
| etc. | |
| The herbicides according to the invention may be employed in cereal crops such as | |
| Avena spp. | Sorghum |
| Triticum spp. | Zea mays |
| Hordeum spp. | *Panicum miliaceum* |
| Secale spp. | Oryza spp. |

-continued

| | |
|---|---|
| *Saccharum offinicarum* | |
| and in dicotyledon crops such as | |
| Cruciferae, e.g. | |
| Brassica spp. | Raphanus spp. |
| Sinapis spp. | Lepidium spp. |
| Compositae, e.g. | |
| Lactuca spp. | Carthamus spp. |
| Helianthus spp. | Scorzonera spp. |
| Malvaceae, e.g. | |
| *Gossypium hirsutum* | |
| Leguminosae, e.g. | |
| Medicago spp. | Phaseolus spp. |
| Trifolium spp. | Arachis spp. |
| Pisum spp. | *Glycine max.* |
| Chenopodiaceae, e.g. | |
| Beta vulgaris | |
| Spinacia spp. | |
| Solanaceae, e.g. | |
| Solanum spp. | *Capsicum annuum* |
| Nicotiania spp. | |
| Linaceae, e.g. | |
| Linum spp. | |
| Umbelliferae, e.g. | |
| Petroselinum spp. | *Apium graveolens* |
| *Daucus carota* | |
| Rosaceae, e.g. | Fragaria |
| Cucurbitaceae, e.g. | |
| Cucumis spp. | Cucurbita spp. |
| Liliaceae, e.g. | |
| Allium spp. | |
| Vitaceae, e.g. | |
| *Vitis vinifera* | |
| Bromeliaceae, e.g. | |
| *Ananas sativus.* | |

The compositions may also be used as total herbicides on ditches, aquatic areas, railway track, barren and waste land, etc.

The compositions were examined in the greenhouse and in the open on the above plants. Their action corresponds to that of the compositions in the following Examples.

EXAMPLE 1

In the greenhouse, various plants were treated at a growth height of from 3 to 20 cm with the following amounts of the following individual active ingredients and compositions thereof as emulsions, dispersions or aqueous solutions:

I 3-isopropyl-2,1,3-benzothiadiazinone-(4)-2,2-dioxide,

II 3-isopropyl-2,1,3-benzothiadiazinone-(4-2,2-dioxide, sodium salt,

III 3-isopropyl-2,1,3-benzothiadiazinone-(4)-2,2-dioxide, dimethylammonium salt, IV 3-isopropyl-2,1,3-benzothiadiazinone-(4)-2,2-dioxide, diethanolammonium salt, each of these compounds at rates of 0.5, 1, 2, 3 and 4 kg/ha;

XXXV amminium-α,β-dichloro-β-phenylpropionate

XLII 4-0-(methylaminosulfonyl)-butyn-2-yl-1N-m-chlorophenylcarbamate each of these compounds at rates of 2, 2.5, 3 and 4 kg/ha;

I+XXXV, II+XXXV, III+XXXV, IV+XXXV,
I+XLII, II+XLII, III+XLII and IV+XLII each of these compositions at rates of 0.5+2.5, 1+2, 1+3 and 2+2 kg/ha.

After 2 to 3 weeks it was ascertained that the compositions had a better herbicidal action than their components, combined with the same crop plant compatibility.

The results are given below:

| Active ingredient | I | | | | | II | | | | |
|---|---|---|---|---|---|---|---|---|---|---|
| kg/ha | 0.5 | 1 | 2 | 3 | 4 | 0.5 | 1 | 2 | 3 | 4 |
| Crop plant: | | | | | | | | | | |
| *Triticum aestivum* | 0 | 0 | 0 | 0 | 0 | 0 | 0 | 0 | 0 | 0 |
| *Hordeum vulgare* | 0 | 0 | 0 | 0 | 0 | 0 | 0 | 0 | 0 | 0 |
| *Secale cereale* | 0 | 0 | 0 | 0 | 0 | 0 | 0 | 0 | 0 | 0 |
| Unwanted plants: | | | | | | | | | | |
| *Galium aparine* | 30 | 60 | 80 | 95 | 100 | 30 | 60 | 80 | 95 | 100 |
| *Avena fatua* | 0 | 0 | 4 | 5 | 10 | 0 | 0 | 0 | 4 | 10 |
| | III | | | | | IV | | | | |
| *Triticum aestivum* | 0 | 0 | 0 | 0 | 0 | 0 | 0 | 0 | 0 | 0 |
| *Hordeum vulgare* | 0 | 0 | 0 | 0 | 0 | 0 | 0 | 0 | 0 | 0 |
| *Secale cereale* | 0 | 0 | 0 | 0 | 0 | 0 | 0 | 0 | 0 | 0 |
| *Galium aparine* | 30 | 50 | 75 | 95 | 100 | 35 | 65 | 80 | 95 | 100 |
| *Avena fatua* | 0 | 0 | 0 | 2 | 5 | 0 | 0 | 0 | 3 | 5 |

| | XXXV | | | | I + XXXV | | | | II + XXXV | | | |
|---|---|---|---|---|---|---|---|---|---|---|---|---|
| Active ingredient | | | | | 0,5 | 1 | 1 | 2 | 0,5 | 1 | 1 | 2 |
| kg/ha | 2 | 2,5 | 3 | 4 | 2,5 | 2 | 3 | 2 | 2,5 | 2 | 3 | 2 |
| Crop plant: | | | | | | | | | | | | |
| *Triticum aestivum* | 0 | 0 | 0 | 0 | 0 | 0 | 0 | 0 | 0 | 0 | 0 | 0 |
| *Hordeum vulgare* | 0 | 0 | 0 | 0 | 0 | 0 | 0 | 0 | 0 | 0 | 0 | 0 |
| *Secale cereale* | 0 | 0 | 0 | 0 | 0 | 0 | 0 | 0 | 0 | 0 | 0 | 0 |
| Unwanted plants: | | | | | | | | | | | | |
| *Galium aparine* | 6 | 10 | 15 | 25 | 90 | 100 | 100 | 100 | 90 | 100 | 100 | 100 |
| *Avena fatua* | 40 | 50 | 60 | 80 | 95 | 86 | 100 | 90 | 95 | 90 | 100 | 90 |
| | | | | | III + XXXV | | | | IV + XXXV | | | |
| *Triticum aestivum* | | | | | 0 | 0 | 0 | 0 | 0 | 0 | 0 | 0 |
| *Hordeum vulgare* | | | | | 0 | 0 | 0 | 0 | 0 | 0 | 0 | 0 |
| *Secale cereale* | | | | | 0 | 0 | 0 | 0 | 0 | 0 | 0 | 0 |
| *Galium aparine* | | | | | 92 | 100 | 100 | 100 | 95 | 100 | 100 | 100 |
| *Avena fatua* | | | | | 94 | 92 | 100 | 90 | 95 | 87 | 100 | 90 |

| | XLII | | | | I + XLII | | | | II + XLII | | | |
|---|---|---|---|---|---|---|---|---|---|---|---|---|
| Active ingredient | | | | | 0,5 | 1 | 1 | 2 | 0,5 | 1 | 1 | 2 |
| kg/ha | 2 | 2,5 | 3 | 4 | 2,5 | 2 | 3 | 2 | 2,5 | 2 | 3 | 2 |
| Crop plant: | | | | | | | | | | | | |
| *Triticum aestivum* | 0 | 0 | 10 | 30 | 0 | 0 | 10 | 0 | 0 | 0 | 10 | 0 |
| *Hordeum vulgare* | 0 | 5 | 10 | 20 | 5 | 0 | 10 | 0 | 5 | 0 | 10 | 0 |
| *Secale cereale* | 5 | 10 | 15 | 25 | 10 | 5 | 15 | 5 | 10 | 5 | 15 | 5 |
| Unwanted plants: | | | | | | | | | | | | |
| *Galium aparine* | 5 | 10 | 15 | 20 | 96 | 100 | 100 | 100 | 95 | 100 | 100 | 100 |
| *Avena fatua* | 70 | 100 | 100 | 100 | 100 | 100 | 100 | 100 | 100 | 100 | 100 | 100 |
| | | | | | III + XLII | | | | IV + XLII | | | |
| *Triticum aestivum* | | | | | 0 | 0 | 10 | 0 | 0 | 0 | 10 | 0 |
| *Hordeum vulgare* | | | | | 5 | 0 | 10 | 0 | 5 | 0 | 10 | 0 |
| *Secale cereale* | | | | | 10 | 5 | 15 | 10 | 10 | 5 | 15 | 5 |
| *Galium aparine* | | | | | 92 | 95 | 100 | 100 | 95 | 100 | 100 | 100 |
| *Avena fatua* | | | | | 100 | 100 | 100 | 100 | 100 | 100 | 100 | 100 |

0 = no damage
100 = complete destruction

EXAMPLE 2

In the greenhouse, various plants were treated at a growth height of from 2 to 18 cm with the following amounts of the following individual active ingredients and compositions thereof as dispersions, oil dispersions or aqueous solutions:

I 3-isopropyl-2,1,3-benzothiadiazinone-(4)-2,2-dioxide,
II 3-isopropyl-2,1,3-benzothiadiazinone-(4)-2,2-dioxide, sodium salt
III 3-isopropyl-2,1,3-benzothiadiazinone-(4)-2,2-dioxide, dimethylammonium salt,
IV 3-isopropyl-2,1,3-benzothiadiazinone-(4)-2,2-dioxide, diethanolammonium salt,
XXVII trichloroacetic acid, sodium salt
XXVIII 2,2-dichloropropionic acid, sodium salt, each of these compounds at rates of 0.25, 0.5, 0.75, 1, 1.5, 2, 3 and 4 kg/ha;

I+XXVII, II+XXVII, III+XXVII, IV+XXVII, I+XXVIII, II+XXVIII, III+XXVIII and IV+XXVIII each composition at rates of 0.25+0.25, 0.5+0.5, 0.75+0.25, 0.25+0.75, 1+0.5, 0.5+1, 0.75+0.75, 1+1, 0.5+1.5, 1.5+0.5, 1.5+1.5, 2+1, 1+2, 3+1, 1+3 and 2+2 kg/ha.

During the experiment the plants were kept fairly dry.

After 2 to 3 weeks it was ascertained that at the lower application rates the compostions had a better herbicidal action than their components, combined with the same crop plant compatibility. Even at the higher rates the compatibility with *Linum usitatissimum* is still good.

The results are given below:

| Active ingredient | I | | | | | | | |
|---|---|---|---|---|---|---|---|---|
| kg/ha | 0.25 | 0.5 | 0.75 | 1 | 1.5 | 2 | 3 | 4 |
| Crop plant: | | | | | | | | |
| *Linum usitatissimum* | 0 | 0 | 0 | 0 | 0 | 0 | 0 | 10 |
| Unwanted plants: | | | | | | | | |
| *Alopecurus myosuroides* | 0 | 3 | 5 | 10 | 15 | 20 | 30 | 34 |
| *Matricaria chamomilla* | 10 | 20 | 40 | 60 | 85 | 90 | 95 | 100 |
| | II | | | | | | | |
| *Linum usitatissimum* | 0 | 0 | 0 | 0 | 0 | 0 | 3 | 10 |
| *Alopecurus myosuroides* | 0 | 5 | 10 | 12 | 15 | 18 | 25 | 30 |
| *Matricaria chamomilla* | 10 | 25 | 35 | 60 | 70 | 85 | 95 | 100 |
| | III | | | | | | | |
| *Linum usitatissimum* | 0 | 0 | 0 | 0 | 0 | 0 | 0 | 10 |
| *Alopecurus myosuroides* | 0 | 5 | 8 | 12 | 16 | 20 | 30 | 34 |
| *Matricaria chamomilla* | 15 | 30 | 45 | 65 | 75 | 85 | 96 | 100 |

| Active ingredient | IV | | | | | | | |
|---|---|---|---|---|---|---|---|---|
| kg/ha | 0.25 | 0.5 | 0.75 | 1 | 1.5 | 2 | 3 | 4 |
| Crop plant: | | | | | | | | |
| *Linum usitatissimum* | 0 | 0 | 0 | 0 | 0 | 0 | 6 | 14 |
| Unwanted plants: | | | | | | | | |
| *Alopecurus myosuroides* | 0 | 4 | 7 | 12 | 17 | 20 | 25 | 35 |
| *Matricaria chamomilla* | 15 | 35 | 50 | 70 | 92 | 98 | 100 | 100 |

| | XXVII | | | | | | | | |
|---|---|---|---|---|---|---|---|---|---|
| kg/ha | 0,25 | 0,5 | 0,75 | 1 | 1,25 | 1,5 | 2 | 3 | 4 |
| *Linum usitatissimum* | 0 | 0 | 0 | 0 | 0 | 0 | 0 | 5 | 15 |
| *Alopecurus myosuroides* | 10 | 20 | 25 | 30 | 35 | 40 | 50 | 65 | 75 |
| *Matricaria chamomilla* | 0 | 0 | 5 | 7 | 9 | 10 | 14 | 18 | 24 |
| | XXVIII | | | | | | | | |
| *Linum usitatissimum* | 0 | 0 | 0 | 0 | 0 | 0 | 0 | 7 | 18 |
| *Alopecurus myosuroides* | 15 | 25 | 30 | 35 | 45 | 50 | 60 | 75 | 90 |
| *Matricaria chamomilla* | 0 | 5 | 5 | 8 | 10 | 10 | 12 | 16 | 20 |

I + XXVII

| Active ingredient | | | | | | | | | | | |
|---|---|---|---|---|---|---|---|---|---|---|---|
| kg/ha | 0.25<br>0.25 | 0.5<br>0.5 | 0.75<br>0.25 | 0.25<br>0.75 | 1<br>0.5 | 0.5<br>1 | 0.75<br>0.75 | 1<br>1 | 0.5<br>1.5 | 1.5<br>0.5 | 1.5<br>1.5 |
| Crop plant: | | | | | | | | | | | |
| *Linum usitatissimum* | 0 | 0 | 0 | 0 | 0 | 0 | 0 | 0 | 0 | 0 | 0 |
| Unwanted plants: | | | | | | | | | | | |
| *Alopecurus myosuroides* | 40 | 66 | 57 | 70 | 70 | 70 | 69 | 80 | 80 | 73 | 95 |
| *Matricaria chamomilla* | 55 | 69 | 85 | 63 | 100 | 86 | 94 | 100 | 85 | 100 | 100 |

| | I + XXVII | | | | | II + XXVII | | | | |
|---|---|---|---|---|---|---|---|---|---|---|
| kg/ha | 2<br>1 | 1<br>2 | 3<br>1 | 1<br>3 | 2<br>2 | 0.25<br>0.75 | 0.5<br>0.5 | 0.75<br>0.25 | 0.25<br>0.75 | 1<br>0.5 |
| *Linum usitatissimum* | 0 | 0 | 0 | 5 | 0 | 0 | 0 | 0 | 0 | 0 |
| *Alopecurus myosuroides* | 90 | 95 | 100 | 100 | 100 | 40 | 60 | 60 | 60 | 70 |
| *Matricaria chamomilla* | 100 | 100 | 100 | 100 | 100 | 50 | 64 | 80 | 63 | 95 |

| | II + XXVII | | | | | | | | | | |
|---|---|---|---|---|---|---|---|---|---|---|---|
| kg/ha | 0.5<br>1 | 0.75<br>0.75 | 1<br>1 | 0.5<br>1.5 | 1.5<br>0.5 | 1.5<br>1.5 | 2<br>1 | 1<br>2 | 3<br>1 | 1<br>3 | 2<br>2 |
| *Linum usitatissimum* | 0 | 0 | 0 | 0 | 0 | 0 | 0 | 0 | 3 | 5 | 0 |
| *Alopecurus myosuroides* | 75 | 70 | 85 | 82 | 75 | 92 | 94 | 98 | 90 | 100 | 100 |
| *Matricaria chamomilla* | 80 | 88 | 100 | 90 | 100 | 100 | 100 | 100 | 100 | 100 | 100 |

| Active ingredient | III + XXVII | | | | | | | | | |
|---|---|---|---|---|---|---|---|---|---|---|
| kg/ha | 0.25<br>0.25 | 0.5<br>0.5 | 0.75<br>0.25 | 0.25<br>0.75 | 1<br>0.5 | 0.5<br>1 | 0.75<br>0.75 | 1<br>1 | 0.5<br>1.5 | 1.5<br>0.5 |
| Crop plant: | | | | | | | | | | |
| *Linum usitatissimum* | 0 | 0 | 0 | 0 | 0 | 0 | 0 | 0 | 0 | 0 |
| Unwanted plants: | | | | | | | | | | |
| *Alopecurus myosuroides* | 42 | 60 | 55 | 60 | 75 | 75 | 70 | 80 | 85 | 70 |
| *Matricaria chamomilla* | 60 | 70 | 90 | 68 | 100 | 80 | 90 | 100 | 90 | 100 |

| | III + XXVII | | | | | | IV + XXVII | | | | |
|---|---|---|---|---|---|---|---|---|---|---|---|
| kg/ha | 1.5<br>1.5 | 2<br>1 | 1<br>2 | 3<br>1 | 1<br>3 | 2<br>2 | 0.25<br>0.25 | 0.5<br>0.5 | 0.75<br>0.25 | 0.25<br>0.75 | 1<br>0.5 |
| *Linum usitatissimum* | 0 | 0 | 0 | 0 | 5 | 0 | 0 | 0 | 0 | 0 | 0 |
| *Alopecurus myosuroides* | 98 | 85 | 100 | 98 | 100 | 100 | 46 | 60 | 55 | 64 | 70 |

-continued

| | | | | | | | | | | | |
|---|---|---|---|---|---|---|---|---|---|---|---|
| *Matricaria chamomilla* | 100 | 100 | 100 | 100 | 100 | 100 | 60 | 80 | 90 | 78 | 100 |

| | IV + XXVII | | | | | | | | | | |
|---|---|---|---|---|---|---|---|---|---|---|---|
| | 0.5 | 0.75 | 1 | 0.5 | 1.5 | 1.5 | 2 | 1 | 3 | 1 | 2 |
| kg/ha | 1 | 0.75 | 1 | 1.5 | 0.5 | 1.5 | 1 | 2 | 1 | 3 | 2 |
| *Linum usitatissimum* | 0 | 0 | 0 | 0 | 0 | 0 | 0 | 0 | 6 | 6 | 0 |
| *Alopecurus myosuroides* | 70 | 70 | 84 | 82 | 75 | 98 | 90 | 100 | 100 | 100 | 100 |
| *Matricaria chamomilla* | 95 | 96 | 100 | 100 | 100 | 100 | 100 | 100 | 100 | 100 | 100 |

| | I + XXVIII | | | | | | | | | | |
|---|---|---|---|---|---|---|---|---|---|---|---|
| Active ingredient | 0.25 | 0.5 | 0.75 | 0.25 | 1 | 0.5 | 0.75 | 1 | 0.5 | 1.5 | 1.5 |
| kg/ha | 0.25 | 0.5 | 0.25 | 0.75 | 0.5 | 1 | 0.75 | 1 | 1.5 | 0.5 | 1.5 |
| Crop plant: | | | | | | | | | | | |
| *Linum usitatissimum* | 0 | 0 | 0 | 0 | 0 | 0 | 0 | 0 | 0 | 0 | 0 |
| Unwanted plants: | | | | | | | | | | | |
| *Alopecurus myosuroides* | 55 | 67 | 63 | 70 | 72 | 80 | 78 | 85 | 93 | 84 | 100 |
| *Matricaria chamomilla* | 57 | 70 | 85 | 64 | 100 | 85 | 90 | 100 | 94 | 100 | 100 |

| | I + XXVIII | | | | | II + XXVIII | | | | |
|---|---|---|---|---|---|---|---|---|---|---|
| | 2 | 1 | 3 | 1 | 2 | 0.25 | 0.5 | 0.75 | 0.25 | 1 |
| kg/ha | 1 | 2 | 1 | 3 | 2 | 0.25 | 0.5 | 0.25 | 0.75 | 0.5 |
| *Linum usitatissimum* | 0 | 0 | 0 | 7 | 0 | 0 | 0 | 0 | 0 | 0 |
| *Alopecurus myosuroides* | 100 | 100 | 100 | 100 | 100 | 55 | 67 | 65 | 70 | 77 |
| *Matricaria chamomilla* | 100 | 100 | 100 | 100 | 100 | 50 | 75 | 80 | 64 | 100 |

| | II + XXVIII | | | | | | | | | | |
|---|---|---|---|---|---|---|---|---|---|---|---|
| Active Ingredient | 0.5 | 0.75 | 1 | 1.5 | 1.5 | 1.5 | 2 | 1 | 3 | 1 | 2 |
| kg/ha | 1 | 0.75 | 1 | 1.5 | 0.5 | 1.5 | 1 | 2 | 1 | 3 | 2 |
| Crop plant: | | | | | | | | | | | |
| *Linum usitatissimum* | 0 | 0 | 0 | 0 | 0 | 0 | 0 | 0 | 3 | 7 | 0 |
| Unwanted plants: | | | | | | | | | | | |
| *Alopecurus myosuroides* | 80 | 80 | 90 | 95 | 82 | 100 | 100 | 100 | 100 | 100 | 100 |
| *Matricaria chamomilla* | 80 | 80 | 100 | 90 | 100 | 100 | 100 | 100 | 100 | 100 | 100 |

| | III + XXVIII | | | | | | | | | |
|---|---|---|---|---|---|---|---|---|---|---|
| | 0,25 | 0,5 | 0,75 | 0,25 | 1 | 0,5 | 0,75 | 1 | 0,5 | 1,5 |
| kg/ha | 0,25 | 0,5 | 0,25 | 0,75 | 0,5 | 1 | 0,75 | 1 | 1,5 | 0,5 |
| *Linum usitatissimum* | 0 | 0 | 0 | 0 | 0 | 0 | 0 | 0 | 0 | 0 |
| *Alopecurus myosuroides* | 60 | 68 | 65 | 75 | 78 | 82 | 80 | 88 | 95 | 80 |
| *Matricaria chamomilla* | 55 | 80 | 90 | 69 | 100 | 80 | 90 | 100 | 90 | 100 |

| | III + XXVIII | | | | | | IV + XXVIII | | | |
|---|---|---|---|---|---|---|---|---|---|---|
| Active ingredient | 1,5 | 2 | 1 | 3 | 1 | 2 | 0,25 | 0,5 | 0,75 | 0,25 |
| kg/ha | 1,5 | 1 | 2 | 1 | 3 | 2 | 0,25 | 0,5 | 0,25 | 0,75 |
| Crop plant: | | | | | | | | | | |
| *Linum usitatissimum* | 0 | 0 | 0 | 0 | 7 | 0 | 0 | 0 | 0 | 0 |
| Unwanted plants: | | | | | | | | | | |
| *Alopecurus myosuroides* | 100 | 93 | 100 | 100 | 100 | 100 | 60 | 69 | 65 | 75 |
| *Matricaria chamomilla* | 100 | 100 | 100 | 100 | 100 | 100 | 60 | 85 | 94 | 75 |

| | IV + XXVIII | | | | | | | | | | | |
|---|---|---|---|---|---|---|---|---|---|---|---|---|
| | 1 | 0.5 | 0.75 | 1 | 0.5 | 1.5 | 1.5 | 2 | 1 | 3 | 1 | 2 |
| kg/ha | 0.5 | 1 | 0.75 | 1 | 1.5 | 0.5 | 1.5 | 1 | 2 | 1 | 3 | 2 |
| *Linum usitatissimum* | 0 | 0 | 0 | 0 | 0 | 0 | 0 | 0 | 0 | 6 | 7 | 0 |
| *Alopecurus myosuroides* | 78 | 82 | 80 | 89 | 95 | 85 | 100 | 98 | 100 | 100 | 100 | 100 |
| *Matricaria chamomilla* | 100 | 95 | 100 | 100 | 100 | 100 | 100 | 100 | 100 | 100 | 100 | 100 |

0 = no damage
100 = complete destruction

I claim:

1. A herbicide composition comprising an inert carrier having dispersed therein a mixture of herbicides consisting essentially of:

a. a benzothiadiazinone dioxide of the formula

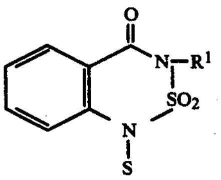

where $R^1$ denotes lower alkyl and $R^2$ denotes hydrogen, sodium, a di-lower alkylammonium or a di-lower hydroxyalkylammonium ion, and b. a carboxylic acid derivative of the formula

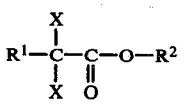

where $R^1$ denotes lower alkyl or chloro, X denotes chloro and $R^2$ is hydrogen or sodium, in a weight ratio of a to b of 3:1 to 1:3.

2. A herbicide composition as claimed in claim 1 wherein compound a is 3-isopropyl-2,1,3-benzothiadiazinone-(4)-2,2-dioxide, the sodium salt thereof, the dimethylammonium salt thereof, or the diethanolammonium salt thereof.

3. A herbicide composition as claimed in claim 1 wherein compound b is the sodium salt of trichloroacetic acid or the sodium salt of 2,2-dichloropropionic acid.

4. A herbicide composition as claimed in claim 1 wherein compound a is 3-isopropyl-2,1,3-benzothiadiazinone-(4)-2,2-dioxide, the sodium salt thereof, the dimethylammonium salt thereof, or the diethanolammonium salt thereof and compound b is the sodium salt of trichloroacetic acid or the sodium salt of 2,2-dichloropropionic acid.

* * * * *

UNITED STATES PATENT AND TRADEMARK OFFICE

CERTIFICATE OF CORRECTION

PATENT NO. : 4,165,977

DATED : August 28, 1979

INVENTOR(S) : FISCHER

It is certified that error appears in the above—identified patent and that said Letters Patent is hereby corrected as shown below:

IN THE CLAIMS

Column 18, line 63, in the formula, "S" should be -- $R^2$ --

Signed and Sealed this

*Fifteenth* Day of *April 1980*

[SEAL]

*Attest:*

SIDNEY A. DIAMOND

*Attesting Officer* *Commissioner of Patents and Trademarks*